July 7, 1953     D. N. MEYERS     2,644,537
SPAR TYPE ROTOR BLADE
Filed May 2, 1947
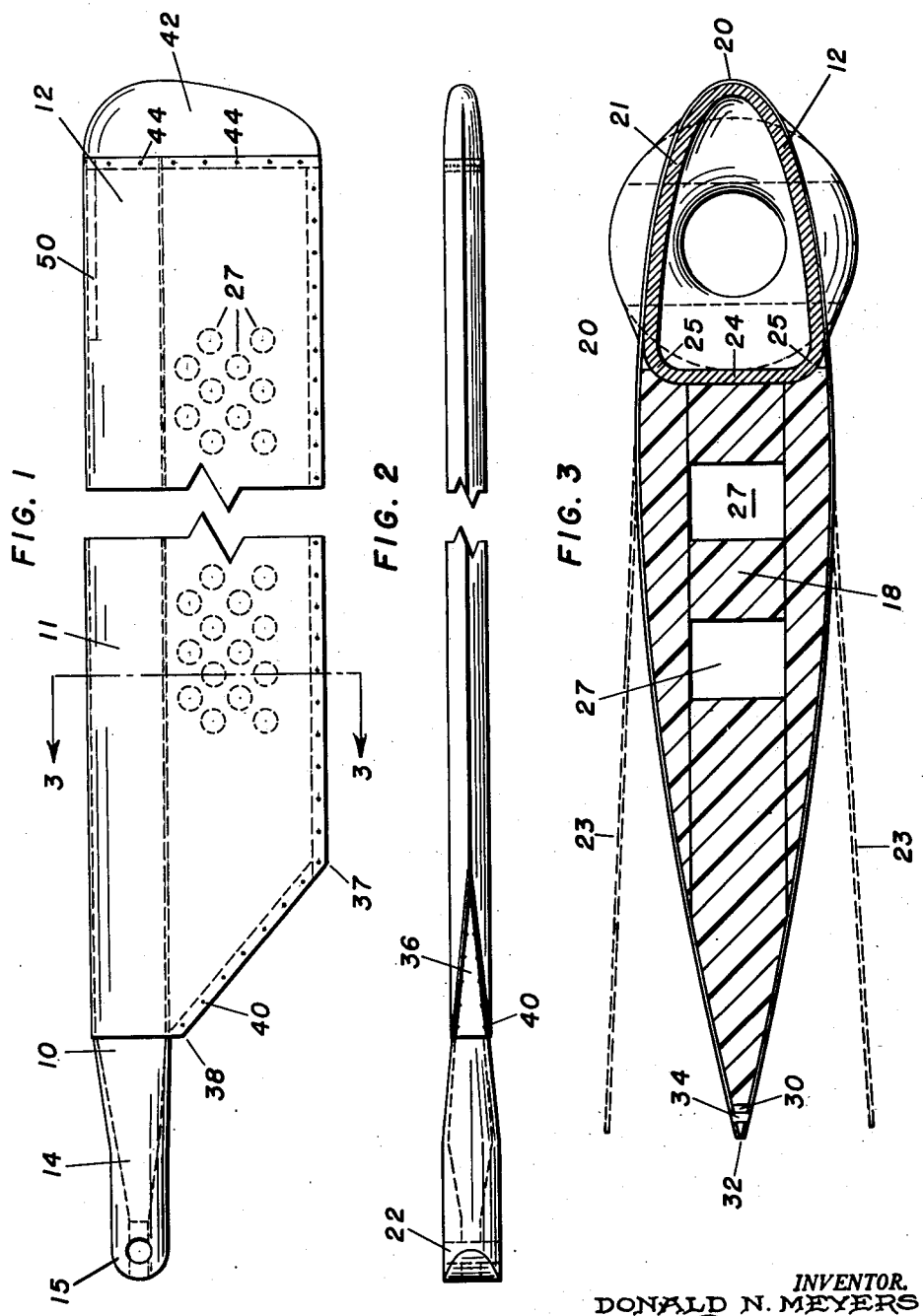
INVENTOR.
DONALD N. MEYERS
BY
*Leech r Radue*
ATTORNEYS Patented July 7, 1953

2,644,537

UNITED STATES PATENT OFFICE 2,644,537

SPAR TYPE ROTOR BLADE

Donald N. Meyers, Philadelphia, Pa., assignor, by mesne assignments, to Piasecki Helicopter Corporation, Morton, Pa., a corporation of Pennsylvania Application May 2, 1947, Serial No. 745,505

1 Claim. (Cl. 170—159)

This invention relates to blades and methods of making them for rotors such as used for sustaining or jointly sustaining and propelling aircraft.

It is a general object of the present invention to provide a novel and improved form of blade for aircraft sustaining rotors and to provide novel methods of making the same.

More particularly it is an object of the invention to provide a blade for aircraft rotors of extreme simplicity of construction and of maximum uniformity and smoothness of contour.

An important object of the invention consists in the provision of a rotor blade in which the conformation of the nose section is achieved solely through the use of a one-piece tubular metal spar, the wall thickness of which is tapered in a longitudinal direction in accordance with the stresses thereon.

Another important object of the invention consists in the construction of a blade for a sustaining rotor composed of a tubular spar of D cross-section contouring the nose portion of the blade and a cellular core contouring the trailing portion, the two portions being covered with a one-piece metal skin bonded to both spar and core.

Still another important object of the invention consists in the construction of a blade for a sustaining rotor in which the root section and attaching fitting are integral with a one-piece blade spar.

An important feature of the invention resides in the construction of the blade with a one-piece tubular spar in which the metal is tapered lengthwise from an integral root member toward the free end of the blade.

Another important feature of the invention comprises the arrangement in a blade of a spar forming the leading edge and nose section thereof which is of extreme rigidity and strength and is abutted, on a substantially vertical plane, against a cellular core of extreme lightness, in which both parts provide dimensional stability for a metal skin having a smooth external airfoil contour uninterrupted by discontinuities, fastenings or the like.

Still another important feature of the invention resides in the arrangement of a blade of the type described whereby all of the parts are secured together without the use of fastening means other than a bonding agent.

Other and further objects and features of the invention, including a novel method of assembling, will be more apparent to those skilled in the art upon a consideration of the accompanying drawing and following specification, wherein is disclosed a single exemplary embodiment, with the understanding that such modifications may be made therein as fall within the scope of the appended claims without departing from the spirit of the invention.

In said drawings:

Fig. 1 is a plan view of a rotor blade constructed in accordance with the present invention, certain interior portions being illustrated in dotted lines;

Fig. 2 is an edge elevation of the blade of Fig. 1 looking toward the trailing edge; and Fig. 3 is a transverse section through the blade taken on a plane at right angles to the axis thereof and illustrating the airfoil section, for instance, on line 3—3 of Fig. 1, this view being on an enlarged scale.

The blades for rotors used as the sustaining wings for autogiros or as the sustaining and propelling means for helicopters are subject to many and varied stresses, and one of the real problems to overcome has been the satisfactory connection of the root section and fitting to the airfoil of the blade. Such connection is subject to stresses of so many types that produce fatigue loading that it is highly critical and offers one of the most difficult problems in the design of such blades. The present invention serves to completely eliminate a joint of that character and to combine the blade spar and root fitting unit into an integral tubular element, the thickness of whose metal walls is adjusted at each section to have the desired strength to resist the stresses in that section whereby a minimum weight is achieved.

The spar of the present invention is a tubular extrusion of varying wall thickness formed to a D section wherein the curved walls correspond to the desired contour of the leading edge and nose section of the blade. The remainder of the blade comprises a light weight cellular core whose principal purpose is to provide a contour for the trailing portion of the airfoil, to add some measure of stiffness to the spar and to reinforce the blade against shear stresses.

The flat rear area face of the spar is securely bonded to the forward face of the core and the assembly is wrapped in a single thin skin sheet bonded throughout its area to the surfaces of the spar and the core and having its meeting edges attached together and to a trailing edge reinforcing strip secured to the core. The blade thus presents a continuous smooth airfoil external surface uninterrupted by any joints, fastenings or other discontinuities so that the air flow over its surface is as nearly perfect as it is possible to achieve.

For the sake of convenience the blade is shown as of substantially rectangular configuration and having a symmetrical airfoil cross-section. These showings do not constitute limitations since obviously the blade can be formed differently in profile and in cross-section and may vary in thickness from root to tip as is desired.

The rotor blade shown in the drawings comprises three essential parts, the first and most important being the spar member 10, comprising the portion 11 included in the airfoil section of the blade and shaped to provide the nose section configuration thereof, as shown at 12, and the root section 14 and root end fitting 15 all constructed integrally from an extruded metal tube. The second part is the preshaped core 18 formed of a rigid cellular material, such as cellulose acetate, which has a desired degree of lightness and rigidity and is suitable as to form, density and dimensional stability. This element may be molded to shape but is preferably constructed of a plurality of bonded plies, as shown in Fig. 3. The third part is the outer covering or skin 20, comprising a sheet of extremely thin metal, such as aluminum or the like, treated to be corrosion resistant, if desired, and tightly fitted to the airfoil section formed by the nose spar and the core. The skin serves several practical functions. It provides an outer covering which fairs the whole blade and covers up any inequalities in the surface of the core and at the junctions of the core and spar surfaces, second, it provides for completely sealing the core material against the absorption of moisture which might change its density and hence the balance of the blade, and third, it provides strength for handling the trailing edge loads of the blade.

The spar element and its integral root portion is constructed from a seamless metal tube of such material as aluminum alloy of the desired hardness and strength. Initially, in an experimental blade constructed according to this invention, the spar comprised a seamless tube of uniform outside diameter and a much less uniform inside diameter. This was extruded, by fitting in a die and using a tapered mandrel, into a tube having the same uniform outside diameter and an inside diameter tapering from the initial diameter at the root fitting to extreme thinness at the spar tip. Between these two extremes the wall thickness tapers at first rapidly in the root section so that in the portion just adjacent the root and intended for inclusion in the airfoil, the initial wall thickness is of appropriate thickness for the stresses encountered. By gradual taper which may or may not be uniform this is reduced to the desired thinness at the blade tip.

By a suitable mechanical operation such as die sinking or drawing this extruded circular tube, in the part intended for inclusion in the airfoil and in the adjacent root section 14, is changed to a D section with the curved part 21 of proper airfoil contour to form the leading edge and nose section of the blade. The root end fitting section remains thick and circular as initially and is machined to shape and perforated by a hole 22 extending vertically therethrough to provide for attachment to the hub section by means of the drag axis pin. The rear wall 24 of the finished spar tube is preferably flat, as clearly seen in Fig. 3, to provide a suitable surface against which the core may be readily abutted and secured. For structural reasons this flat surface merges by rather large radius fillets 25 with the airfoil nose section 21.

The free end of the spar may be closed and sealed off if desired to facilitate the exclusion of moisture from the core. Furthermore, being hollow, the spar can be used for the circulation of heat throughout the whole leading edge of the wing for anti-icing or de-icing as desired, acting under these conditions as a conduit for heated air.

The core 18, as previously mentioned, is preferably fabricated from multiple plies of cellular material. This facilitates the lightening of the center ply or of all but the outer plies by the removal of the material forming the large perforations 27. Since these are in the center ply they have but little bearing on the strength of the core as a beam structure, and being staggered do not seriously affect its shear strength. The center ply, where three plies are used, is preferably about twice as thick as the outer plies, and being sandwiched between them has its perforations closed so that only a smooth contour is presented to the skin. While molding may be resorted to for forming the core to a desired shape, this would not readily permit the formation of the perforations, nor would it insure as accurate an airfoil contour as can be effected by machining the surface after the core ply material is completely cooled and shrunken following its formation. The plies are appropriately bonded together prior to machining by the use of suitable cementing material, either cold or of the type requiring heat for its proper action.

The front end of the core is carefully machined to fit not only the back wall 24 but also the fillets 25 of the spar. A trailing edge reinforcing strip 30 is applied to the core and may comprise a metal strip of triangular cross-section adhesively secured thereto or otherwise attached. A suitable bonding material coats the rear face of the spar and the front edge of the core prior to assembly so that secure attachment is effected between the two without the use of mechanical fastenings. When this attachment is complete a thin skin, such as the aluminum sheet 20 illustrated, is folded to the shape shown by dotted line 23 and fitted about the spar and the core. It is then formed down onto the trailing portion of the blade so that the only seam occurs at the abutting of the two rear edges as at 32 where they project beyond the trailing edge reinforcing strip 30. Prior to the assembly of the skin its inner surface and/or the outer surface of the core and spar, are liberally coated with a suitable resin type adhesive.

When the skin has been formed down to the airfoil, rivets 34 are extended through the rear edges of the skin and the reinforcing strip 30 to hold the assembly together until bonding. The triangular area 36 between the inner corner 37 of the airfoil, and the junction of the skin with the spar 38 is filled in with a strip of sheet metal flanged at both edges, which flanges are riveted as at 40 to the skin. This sheet is also adhesively attached to the appropriate faces of the core and spar.

At an appropriate time during the skin assembly the tip 42, which is a deep drawn aluminum shell, is fitted over the core and riveted by rivets 44 to the skin and to the tip of the spar. This connection is used since it is inconvenient to form the tip integral with the skin.

The whole assembly is now placed in a two part mold having the desired contour and the blade is compressed therein and heated so that all of the bonding material in the whole assembly is set up, insuring close and strong adhesive contact between all of the outer surfaces of the two structural parts and the inner surface of the skin. The adhesive material is used where the tip is applied and where the skin laps the reinforcing strip so that the shear of the rivets is at a minimum. Its liberal use on all faying surfaces insures against any moisture leaking in to change the weight of the core.

If the blade is not appropriately balanced by the sizing of the parts solely for structural reasons, either about its pitching axis or otherwise, additional weight may be added for the purpose, such as by riveting or bonding a concentrated weight member to the inside of the leading edge of the spar member, as shown at 50. As an alternative the spar taper can be suitably altered or the density of the core changed.

This blade has the advantage of completely eliminating from the structural portions thereof any joints, discontinuities or other stress raisers which might lead to its ultimate fatigue failure. The skin is a single seamless sheet giving maximum smoothness to the exterior. The spar constitutes not only the structural strength member but the whole nose section of the blade. Because of its tapered wall a more uniform stress distribution is achieved throughout the whole blade, and there is a continuous support for the whole skin at the leading edge by a rigid, dense structural member. The metal in this blade is used to its greatest advantage under all conditions. Since only two metal parts are used and both are preferably of the same metal, problems of differential thermal expansion from the extremes of temperatures encountered in different seasons and in different localities are eliminated, and likewise since the metals are similar no electrolysis difficulties will be encountered. Corrosion can be controlled by the selection of the type of aluminum, which is nearly the most corrosion resistant of the structural metals.

I claim:

For an aircraft sustaining rotor, a blade including an airfoil section and a root and fitting section: the leading portion of the airfoil section and the root and fitting section comprising a unitary metal spar tube having a thick walled inner end, an intermediate portion rapidly expanding in cross-sectional dimensions and rapidly decreasing in wall thickness and merging with the portion of airfoil leading edge cross-section having a flat rear face, the walls of said last mentioned portion decreasing in thickness throughout the length thereof; a cellular core of dimensionally stable, non-absorbent, rigid synthetic material forming the whole remainder of the airfoil and bonded to the spar along said flat rear face, said core including at least three laminae adhesively joined in planes substantially parallel to the chord of the blade, at least one intermediate lamination being perforated transversely to said planes to reduce its weight; and a one piece sheet metal skin tightly enclosing the whole airfoil section; the three parts of the blade being secured together solely by adhesive to insure maximum surface smoothness.

DONALD N. MEYERS.

References Cited in the file of this patent

UNITED STATES PATENTS

| Number | Name | Date |
|---|---|---|
| 1,682,399 | Mitchell | Aug. 28, 1930 |
| 1,785,543 | Dornier | Dec. 16, 1930 |
| 2,056,592 | Siddely | Oct. 6, 1936 |
| 2,121,052 | Roberts | June 21, 1938 |
| 2,152,861 | Bennett | Apr. 4, 1939 |
| 2,183,158 | Bennett | Dec. 12, 1939 |
| 2,303,707 | Pullin | Dec. 1, 1942 |
| 2,394,445 | Handler | Feb. 5, 1946 |
| 2,467,031 | Hess | Apr. 12, 1949 |
| 2,470,056 | Seibel | May 10, 1949 |
| 2,484,141 | Alex | Oct. 11, 1949 |

FOREIGN PATENTS

| Number | Country | Date |
|---|---|---|
| 132,849 | Great Britain | Sept. 22, 1919 |
| 588,997 | Germany | Dec. 1, 1933 |